J. E. SIMMONS.
RUNNING GEAR FOR VEHICLES.
APPLICATION FILED OCT. 4, 1913.

1,118,242.

Patented Nov. 24, 1914.
3 SHEETS—SHEET 1.

WITNESSES:
Wm. C. Schmitt
Mary E. Wagner

INVENTOR
John E. Simmons.
BY J. J. Gisler
ATTORNEY

J. E. SIMMONS.
RUNNING GEAR FOR VEHICLES.
APPLICATION FILED OCT. 4, 1913.

1,118,242.

Patented Nov. 24, 1914.
3 SHEETS—SHEET 2.

WITNESSES:
Wm. P. Schmitt
Mary E. Wagner

INVENTOR
John E. Simmons
BY J. J. Geisler
ATTORNEY

J. E. SIMMONS.
RUNNING GEAR FOR VEHICLES.
APPLICATION FILED OCT. 4, 1913.

1,118,242.

Patented Nov. 24, 1914.
3 SHEETS—SHEET 3.

WITNESSES:
Wm. P. Schmitt
Mary E. Wagner

INVENTOR
John E. Simmons.
BY
J. J. Geisler
ATTORNEY

UNITED STATES PATENT OFFICE.

JOHN E. SIMMONS, OF PORTLAND, OREGON.

RUNNING-GEAR FOR VEHICLES.

1,118,242.  Specification of Letters Patent.  Patented Nov. 24, 1914.

Application filed October 4, 1913. Serial No. 793,475.

*To all whom it may concern:*

Be it known that I, JOHN E. SIMMONS, a citizen of the United States, and a resident of the city of Portland, county of Multnomah, State of Oregon, have invented a new and useful Improvement in Running-Gear for Vehicles, of which the following is a specification.

My invention relates to the rendering of vehicles easy riding without using pneumatic tires. Heretofore the attainment of this result has been attempted by introducing a resilient element between the rim and the hub of the wheels, and making the spoke telescopic; but such structures have not been successful for the reason that the center bearing of such a wheel constantly changes, thereby rendering the wheel eccentric and requiring greater power to drive the same.

The object of my invention is to provide efficient shock-absorbing means between the axle and the wheel instead of in the wheel itself.

In my invention the wheel is of the common rigid type, and the supporting axle embodies the resilient element; the devices being constructed and arranged and operating as hereinafter fully set forth.

Figure 1:
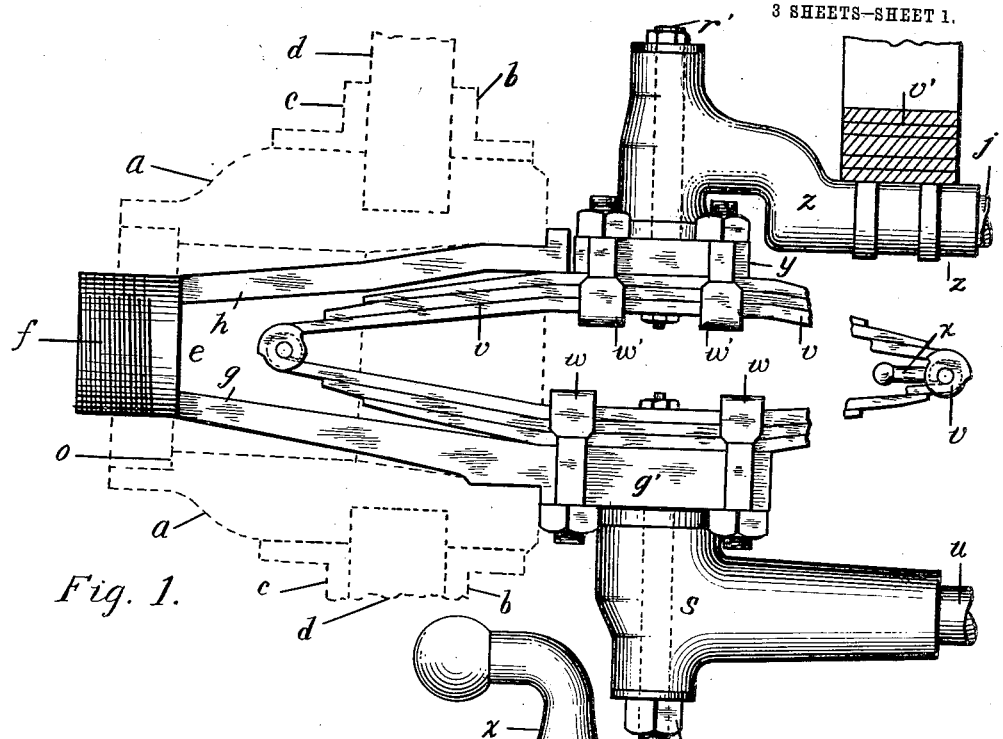
Figure 2:
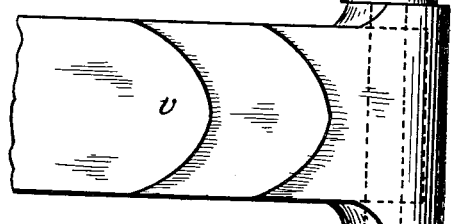
Figure 3:
Figure 3:
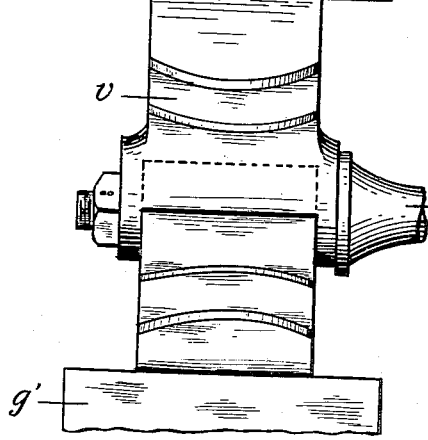
Figure 4:
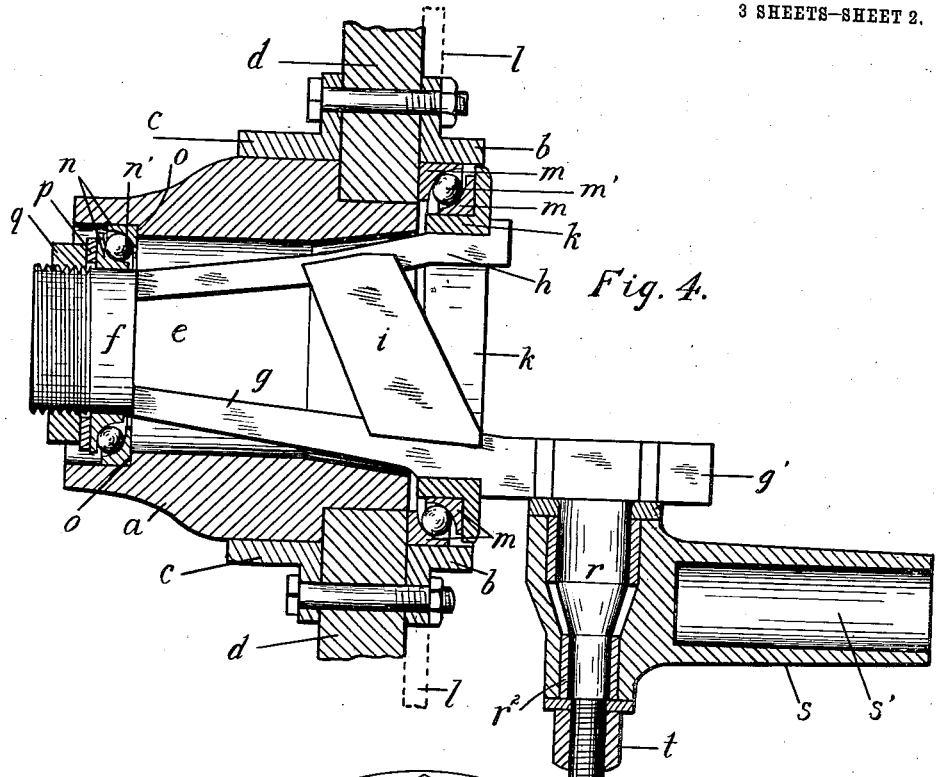
Figure 5:
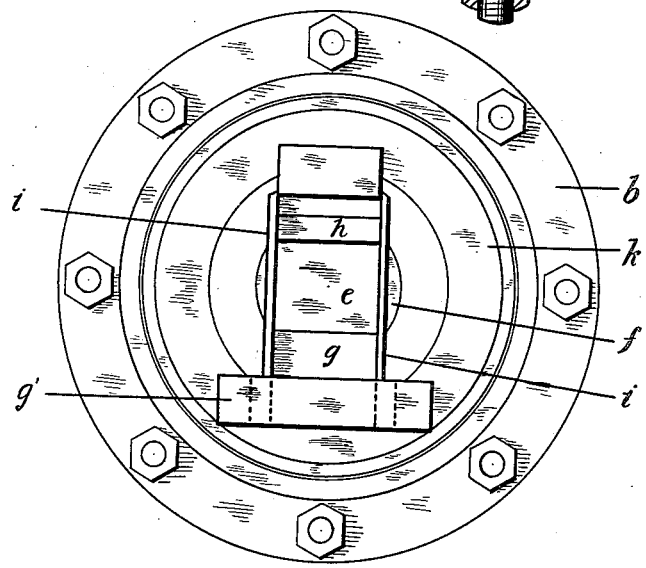
Figure 6:
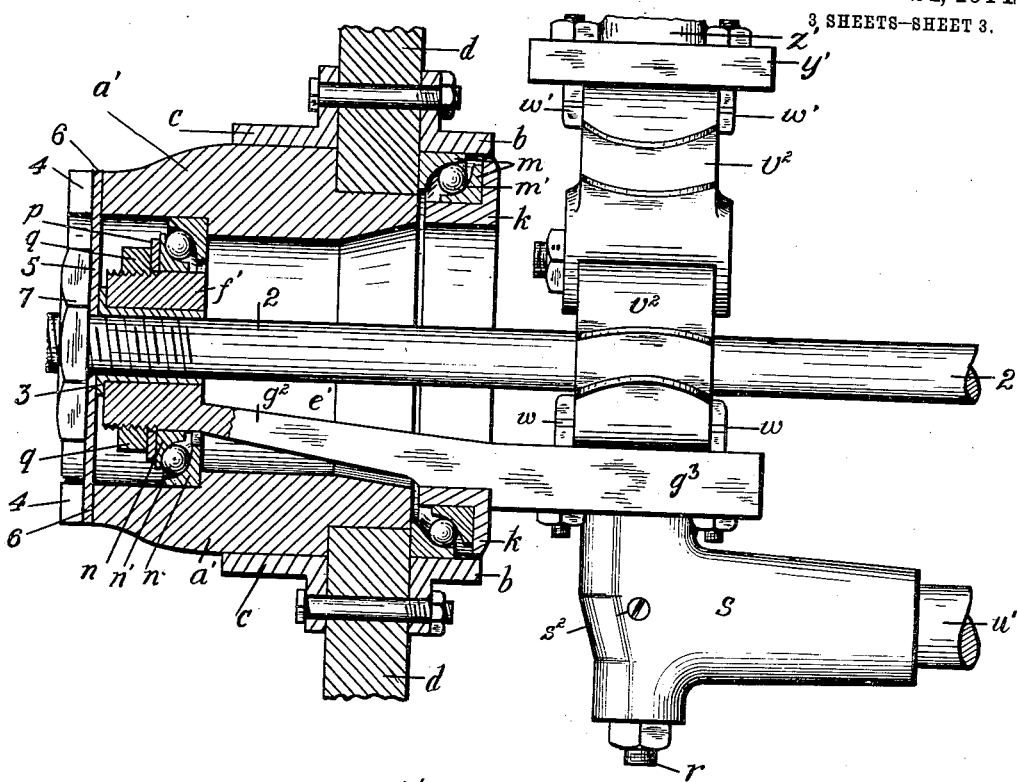
Figure 7:
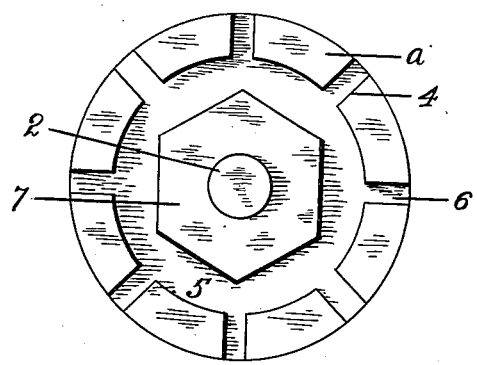

In the accompanying drawings: Figure 1 is a front elevation showing my invention embodied in the left end of the front axle of a vehicle; the hub of the wheel and portions of the spokes being shown in broken lines, and the spring which forms the resilient element being partially broken away; Fig. 2 is a plan or top view of the right-end of the spring, showing the steering knuckle; Fig. 3 is a right end elevation of the spring; Fig. 4 is a vertical section of the hub of the wheel, showing the end of the supporting axle rotatably mounted therein; the spring shown in the preceding views, also the main body of the axle being omitted; the broken lines of this figure indicate the location of a sprocket wheel, to be used on the rear wheels when the vehicle is to be chain driven, under the latter condition the wheels would not be used as steering wheels and therefore would not turn laterally; Fig. 5 is a right-end elevation of the hub shown in the full lines of Fig. 4, omitting, however, the spokes, $d$, the pin, $r$, and the arm $s$; Fig. 6 shows a modified form of construction to be used when my invention is to be embodied with the rear wheels of a shaft-driven vehicle; and Fig. 7 is a view showing the left end of the hub illustrated in Fig. 6: this view details the construction of the washer made with peripheral lugs adapted to engage with the peripheral notches of the hub.

The details of only one end of an axle and related parts, and the mounting of the wheel thereon, will suffice for the understanding of my invention.

$a$ represents the wheel hub and $j$ the front axle. To each end of the latter is affixed the stub axle $e$ on which is journaled the wheel. The stub-axle, $e$, is made of skeleton form, that is, of any convenient form providing an internal space. I found it convenient to make such skeleton stub axle $e$ of members $g$, $h$ arranged in V-shape, and adapted to be inserted in the wheel hub $a$, and integral with the vertex of such members, $g$, $h$, is a threaded cylindrical piece $f$. The member $g$ is made with an extension $g'$. The hub, $a$, is made with flanged rings, $b$, $c$, located on either side of and bolted together through the spokes $d$, as shown in Fig. 4.

A flanged ring, $k$, (see Fig. 4) abuts against shoulders provided on the extremities of the members $g$, $h$.

Ball-bearing elements, $m$, $m'$, are placed between the rings, $b$, $k$, on the inside of the wheel hub, and other ball-bearing elements, $n$, $n'$, are provided on the outside of the wheel-hub between the shoulder $o$ and a washer $p$, the latter encircling the threaded portion $f$ and being secured in place by a lock-nut $q$, threaded on said portion $f$. As apparent the wheel is rotatable on the stub axle $e$, but is not laterally movable.

On the extension $g'$ of the member $g$ is a pendent pin $r$. A laterally extending arm $s$ is hinged on said pin, being held in place by a nut $t$, as shown in Figs. 1 and 4. Said arm is made with a socket $s'$, in which are inserted the ends of the companion or brace shaft $u$.

An elliptic leaf spring, $v$, is bolted on the upper side of the extension $g'$ of the member $g$ by the U bolts $w$, see Fig. 1. One end of said spring $v$ projects between the members, $g$, $h$, of the stub axle $e$; the other end of said spring is made with a steering knuckle $x$; the position of which affords efficient leverage to the steering devices, and facilitates the steering operation. Bolted on the top of the spring $v$ by U bolts $w'$ is a plate $y$, bearing a vertical journal pin $r'$, similar to the pin $r$. These two pins lie in a common vertical axis. A lateral socket arm $z$ is pivotally mounted on said journal pin $r'$, and the ends of the main axle $j$ are supported in the socket arms $z$ located on the opposite sides of the vehicle. The common elliptic leaf springs $v'$, extending longitudinally with the vehicle body, are bolted on the arms $z$, and support the vehicle body. $r^2$ is a bushing.

The construction shown in Figs. 1 to 5 inclusive is used in connection with the front or steering wheels of a motor-driven vehicle. When my invention is to be used in connection with the driven wheels of such vehicle, the construction in Figs. 6 and 7 is convenient.

The stub axle $e'$ is journaled in the hub $a'$ of the wheel. The skeleton stub axle $e'$ may be made, for economy, with only one member $g^2$, and the cylindrical threaded piece $f'$ is cored out for receiving the related end of the driving axle 2. A brace shaft $u'$ is rigidly connected to the extension $g^3$ of the member $g^2$ by the sprocket or T piece $s$ and screw $s^2$.

Instead of a spring $v$, shown in Fig. 1, there is bolted on the upper side of the extension $g^3$ an elliptic leaf-spring $v^2$, arranged longitudinally to the vehicle. The plate $y'$ is bolted to the spring $v^2$, and to said plate $y'$ is bolted, in any convenient manner, one end of the rear axle, as represented at $z'$.

The driving axle 2 of the vehicle is made with threaded ends which extend through the springs $v^2$ and project through the related cored-out portion $f'$ of the skeleton stub axle $e'$. 3 represents a bushing. The outer end of the hub $a'$ is made with a series of circumferential recesses 4, as shown in Fig. 7; a washer 5, made with peripheral lugs 6, is seated in such recesses 4 of the hub, and a lock-nut 7, threaded on the driving axle 2, holds said washer 5 in place, and thus connects the wheel with the driving axle 2.

I claim:

1. In the running gear of a vehicle, the combination of a main axle supporting the vehicle body, a supplemental axle, stub axles supported by the extremities of the supplemental axle, and a resilient element mounted on each stub axle and supporting the main axle.

2. In the running gear of a vehicle, the combination of a main axle supporting the vehicle body, a supplemental axle, stub axles supported by the extremities of the supplemental axle, and an elliptic spring mounted on each stub axle and supporting the main axle.

3. In the running gear of a vehicle, the combination of a main axle supporting the vehicle body, a supplemental axle, stub axles supported by the extremities of the supplemental axle, a resilient element mounted on each stub axle and supporting the main axle, the connections of the parts being adapted to permit the stub axles to be rotated in a horizontal plane between the main and the supplemental axles; and steering means connected with the resilient element.

4. In the running gear of a vehicle, the combination of a main axle supporting the vehicle body, a supplemental axle, stub axles supported by the extremities of the supplemental axle, an elliptic spring mounted on each stub axle and supporting the main axle, the connections of the parts being adapted to permit the stub axles to be rotated in a horizontal plane between the main and the supplemental axles: and steering means connected with the elliptic spring.

5. In the running gear of a vehicle, the combination of a main axle supporting the vehicle body, a supplemental axle arranged parallel to the main axle, stub axles supported by the extremities of the supplemental axle, and a resilient element mounted on each stub axle and supporting the main axle.

6. In the running gear of a vehicle, the combination of a main axle supporting the vehicle body, a supplemental axle arranged parallel to the main axle, stub axles supported by the extremities of the supplemental axle, a resilient element mounted on each stub axle and supporting the main axle, the connections of the parts being adapted to permit the stub axles to be rotated in a horizontal plane between the main and the supplemental axles; and steering means connected with the resilient element.

JOHN E. SIMMONS.

Witnesses:
Wm. C. Schmitt,
Cecil Long.